May 17, 1960 — R. VOGT — 2,936,966
WING CONSTRUCTION FOR HIGH SPEED AIRCRAFT
Filed March 19, 1956 — 2 Sheets-Sheet 1

INVENTOR.
RICHARD VOGT
BY *Ralph B. Pastoriza*
ATTORNEY

May 17, 1960        R. VOGT        2,936,966
WING CONSTRUCTION FOR HIGH SPEED AIRCRAFT
Filed March 19, 1956        2 Sheets-Sheet 2

INVENTOR.
RICHARD VOGT
BY *Ralph C. Pastoriza*
ATTORNEY

United States Patent Office 2,936,966
Patented May 17, 1960

2,936,966

WING CONSTRUCTION FOR HIGH SPEED AIRCRAFT

Richard Vogt, Pacific Palisades, Calif., assignor, by mesne assignments, to Curtiss-Wright Corporation, a corporation of Delaware Application March 19, 1956, Serial No. 573,065

5 Claims. (Cl. 244—2)

This invention relates generally to aircraft and more particularly to an improved wing construction for coupling aircraft wings together to effectively increase the aspect ratio.

In United States patent application Serial No. 72,467, filed by applicant January 24, 1949, entitled Automatic Alignment Mechanism for Composite Aircraft, there is described in considerable detail the increased load carrying capacity of composite aircraft in which the wing tips of the aircraft are hingedly connected. By so hinging two or more aircraft together in this manner, the wing span is enormously increased resulting in an extremely high aspect ratio without any appreciable increase in weight due to the wing supporting structures. In accordance with an important feature in the above-identified application, the auxiliary aircraft or wing panels are provided with elevators or flaps linked to the parent aircraft in such a manner that any tendency for the auxiliary aircraft wing panels to move out of line or change their dihedral angle with respect to the principal wing is immediately corrected aerodynamically by movement of the flaps. By means of such a construction, the structural strength requirements at the hinge points are minimized.

In modern high speed aircraft having highly tapered wings or even a delta or diamond wing in which the wing tips converge to a very small chord or to points, the attachment of auxiliary aircraft or floating panels to the pointed tips of the wing cannot readily be accomplished without extensive modification of the plan form of the wing tips. Therefore, it has not, heretofore, been feasible to take advantage of the concepts in the above-mentioned application in the case of such transonic and supersonic aircraft.

Bearing the above in mind, a principal object of the present invention is to provide an improved hinge coupling structure enabling auxiliary aircraft or wing panels to be readily affixed to the wings of high speed aircraft particularly of the delta or diamond construction.

More particularly, an object of this invention is to provide a wing construction for securing an auxiliary floating wing panel adjacent the end portion of a delta or diamond shaped wing whereby the aspect ratio of the over-all configuration is substantially increased without extensive structural modifications or increased structural weight.

Still another important object is to provide a wing construction of the above type including coupling means for aerodynamically controlling the auxiliary aircraft or panel to maintain it in a desired relationship with respect to the principal wing during conventional flight maneuvers.

Briefly, these and other objects and advantages of this invention are attained by coupling the auxiliary wing panel to the principal aircraft at a point spaced inwardly from the tip of the wing so that the panel and wing are vertically spaced and in partial overlapping relationship. In accordance with the invention, the auxiliary wing panel may be positioned above and partially inwardly of the principal wing or, alternatively, below and partially inwardly of the principal wing. The coupling or supporting structure itself includes a vertical fin having a hinge means for maintaining the wing and panel at a given vertical spacing and permitting free angular movement. Also included in the structure is a mechanical linking system for controlling suitable elevators or flaps on the panel in accordance with movement of the panel out of parallelism with the plane of the principal wing.

A better understanding of the invention may be had by referring to a preferred embodiment thereof as illustrated in the accompanying drawings in which.

Figure 1:
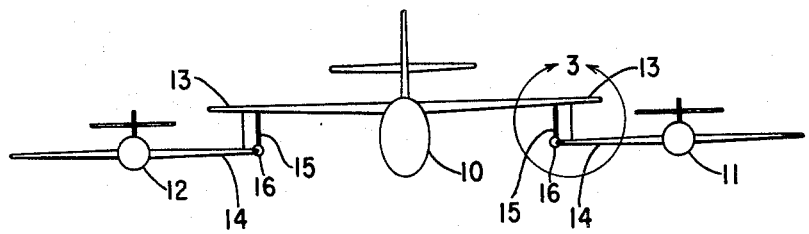
Figure 1 is a front view illustrating a parent craft and two auxiliary craft or wing panels secured adjacent the tips of the parent aircraft in accordance with the invention.

Referring to Figure 1, there is shown a parent aircraft 10 and two auxiliary aircraft or floating wing panels 11 and 12. The end portions of the principal wing 13 of the parent aircraft 10 are coupled to the wing panels 14 of the auxiliary aircraft 11 and 12 by means of vertical fins 15 and hinge constructions designated generally by the numeral 16. As shown, each vertical fin 15 is spaced inwardly of the tip end of the principal wing 13 a given distance so that the principal wing 13 and the wing panel 14 partially overlap.

Figure 2:
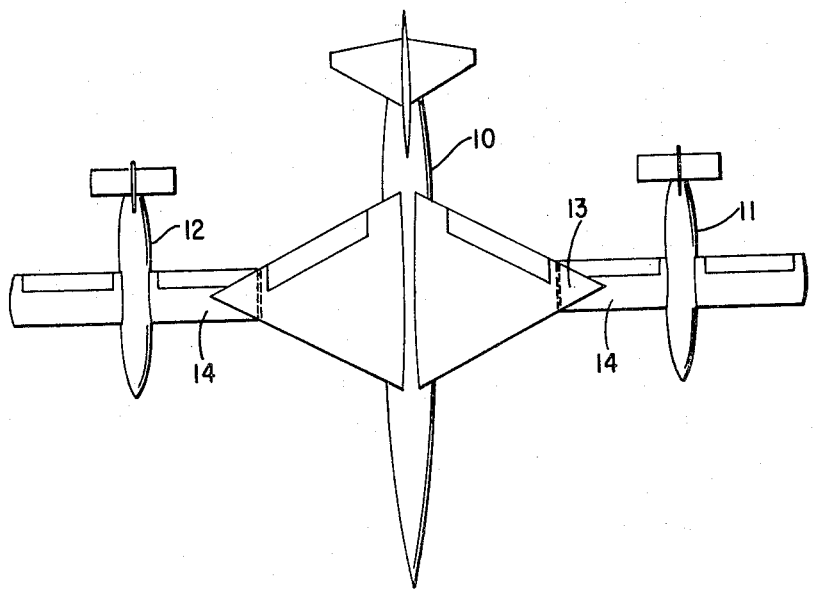
Figure 2 is a plan view of the composite aircraft configuration illustrated in Figure 1.

Referring specifically to Figure 2, the degree of overlap or inward spacing of the vertical fin is determined by the particular shape of the principal wing. In Figure 2, a diamond wing construction is shown in which the wing cord decreases uniformly from the root toward the tip. Preferably, the securement of the vertical fin 15 to the under side of the wing 13 is at a point at which the cord of the wing 13 is substantially equal to the cord of the panel 14.

While the auxiliary wing panels 14 have been illustrated in Figures 1 and 2 as being secured to an under portion of the principal wings 13, it is to be understood that they could as well be secured above the wings in overlapping relationship.

Figure 3:
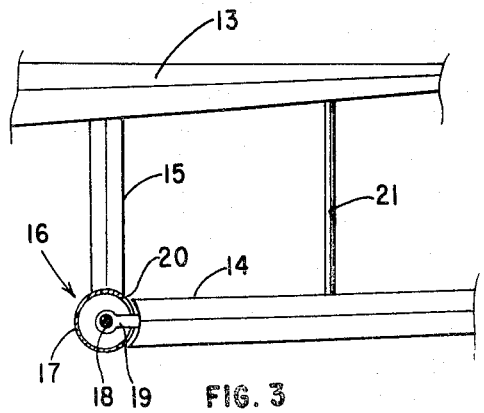
Figure 3 is an enlarged view partly in cross section of that portion of Figure 1 enclosed in the circular arrow 3.

Referring now to Figure 3, there is illustrated an enlarged view of the details of the hinge 16. As shown, the vertical fin 15 terminates at its lower end in a cylindrical tube 17 having a central or axial hinge rod 18 supported therein. A connecting rod 19 is provided with an apertured head portion through which the rod 18 passes. The rod 19 is arranged to extend through a slot 20 to rigidly connect to the tip of the floating panel 14.

Figure 4:
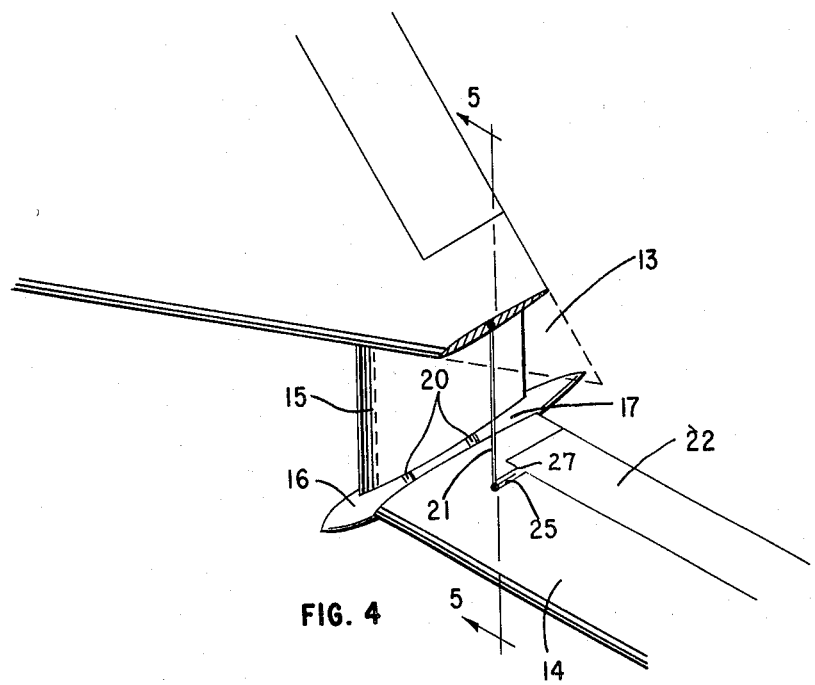
Figure 4 is an enlarged perspective view of the wing construction of this invention; and, Figure 5 is an end view partly in cross section taken in the direction of the arrows 5—5 of Figure 4.

As best seen in the perspective view of Figure 4, two such slots 20 are provided and have an arcuate extent sufficient to permit rotative movement of the panel 14 to take place over a reasonable arc. It will also be noted in Figure 4 that the cylinder 17 is provided with a streamlined nose piece and tail piece so that an aerodynamically clean structure results.

In Figures 3 and 4 the fin 15 is shown and described as having its upper end rigidly secured to the principal wing 13 at a suitable distance spaced inwardly from the tip of the principal wing. Alternatively, however, the hinge structure 16 could be positioned between the upper portion of the fin 15 and the principal wing 13 and the lower portion of the fin 15 rigidly secured to the floating panel 14. In other words, whether the floating panel is hinged to the vertical fin at its lower end, or whether the vertical fin and panel constitute a rigid structure and the vertical fin is hinged to the wing 13 at its upper end is of little consequence. Further, the vertical fin itself could be split or hinged intermediate its upper and lower ends, these ends being rigidly secured to the wing and panel respectively.

With the structural arrangement described thus far, it will be apparent that floating panels may be affixed to delta or diamond shaped wings in a structurally satisfactory manner notwithstanding that the delta or diamond shaped wing tips terminate in points. It is important in such a hinged construction, however, that some means be provided for maintaining the floating panel in substantially parallel relationship with the principal wing in order that the advantages of the increased effective aspect ratio are realized. For this purpose, there is provided a control means associated with the hinge means in the form of a vertical link 21 arranged to actuate a lift flap 22 on the floating panel. As shown best in Figure 5, this flap 22 is arranged to rotate about its hinge axis 23 and is provided with an extension 24 secured through a suitable swivel joint 25 to the lower end of the link 21. The upper portion of the link 21 is secured to an under portion of the principal wing 13 by a second swivel joint 26. A slot opening 27 may be provided in the panel 14, as clearly illustrated in Figure 4, to accommodate arcuate movement of the extension 24 of the flap 22.

Figure 5:
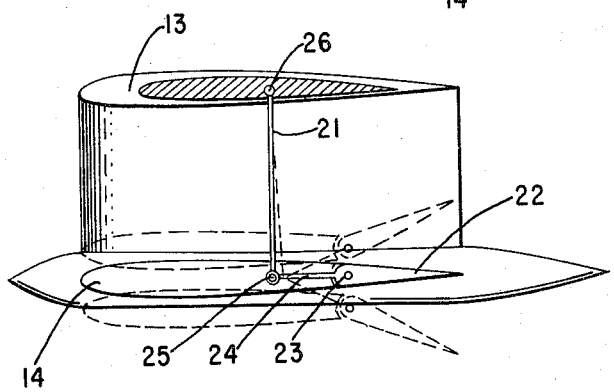

In the operation of this linkage, should the floating panel 14 swing about the hinge structure 16 so that it moves out of parallelism with the principal wing 13, the link 21 will pivot the flap 22 about its hinge axis 23 as indicated by the dotted lines in Figure 5. Thus, for example, should the floating panel drop or rotate downwardly to the lower dotted line position shown in Figure 5, the distance between the under portion of the principal wing 13 and the corresponding portion of the panel 14 will increase, whereby the link 21 will effectively rotate the flap 22 in a clockwise direction as viewed in Figure 5. The flap thus is lowered whereby the resulting aerodynamic lift on the panel 14 will move it back to its parallel position. Similarly, if the flap 22 rotates upwardly, the link 21 will be pushed further into the slot 27 to rotate the flap 22 in a counterclockwise direction as viewed in Figure 5, whereby aerodynamic forces are generated tending to move the flap downwardly again into parallel relationship with the principal wing.

It is apparent accordingly, that the present invention provides an extremely simple means for attaching auxiliary aircraft wings or floating panels to the wings of high speed aircraft of the diamond or delta construction without extensive modification of either the principal or auxiliary wings. The invention therefore enables the various features described in my original application to be taken advantage of in delta and diamond wing constructions. Preferably, the vertical fin includes release means whereby it may be dropped from the principal wing to free the auxiliary aircraft. Such a release mechanism, although desirable, forms no part of the present invention and is therefore not described nor shown.

What is claimed:

1. A wing construction for aircraft comprising: at least one wing panel positioned adjacent the tip portion of one wing of said aircraft; a vertical fin extending normally from the plane of said wing of said aircraft from a position measured inwardly from the tip of said wing, said fin engaging at its free end a portion of said panel whereby said wing and panel are vertically spaced by said fin and are in partially overlapping relationship; and hinge means supported by and connected to said vertical fin whereby said panel and wing are free for relative rotative movement with respect to each other about said hinge means.

2. The subject matter of claim 1, in which the cord of said wing progressively decreases from its root to its tip, said fin being positioned at a point at which the cord of said wing is of a length substantially equal to the cord of said vertical fin.

3. The subject matter of claim 1, in which said hinge means is positioned between the tip of said panel and the free end of said vertical fin, said hinge means including a cylindrical portion having a central hinge rod and circumferential slots; supporting members rotatably mounted on said rod and passing out said slots into rigid securement with said panel whereby said panel is free to move about said hinge rod in an arcuate motion whereby the dihedral angle of said panel and wing varies.

4. The subject matter of claim 3, including a control flap on said panel; and link means coupled to said control flap and to said wing at a point spaced from said vertical fin in the direction of the longitudinal axis of said wing whereby changes in the dihedral angle as a result of relative rotative movement between said panel and said wing about said hinge rod, move said link to actuate said control flap in a direction such that resulting aerodynamic forces tend to move said panel back into a position substantially parallel to said wing.

5. A high aspect ratio wing construction for aircraft to attain maximum load carrying ability with minimum structural weight comprising, in combination: at least one wing panel positioned partially to overlap the tip of one wing of said aircraft to provide overlapping portions; support means interposed between said overlapping portions to space vertically said panel and wing a sufficient distance to permit relative movement of said panel and wing with respect to each other, said support means being connected to said wing at a point a given distance measured inwardly from the tip of said wing; a control flap on said panel; and link means connected between said control flap and said wing of said aircraft at a location spaced from said point in the direction of the longitudinal axis of said wing, whereby relative movements of said panel and said wing move said link means to actuate said control flap.

References Cited in the file of this patent

UNITED STATES PATENTS

| 2,124,867 | Akerman | July 26, 1938 |
| 2,421,742 | Buettner | June 10, 1947 |

FOREIGN PATENTS

| 566,201 | Great Britain | Dec. 19, 1944 |